United States Patent
Eakins et al.

(10) Patent No.: US 9,126,336 B2
(45) Date of Patent: Sep. 8, 2015

(54) COMPLIANT END OF ARM TOOLING FOR A ROBOT

(71) Applicants: William Eakins, Bloomfield, CT (US); Thomas A. Fuhlbrigge, Ellington, CT (US); Carlos Martinez, West Hartford, CT (US); Heping Chen, Austin, TX (US); Gregory Rossano, Enfield, CT (US)

(72) Inventors: William Eakins, Bloomfield, CT (US); Thomas A. Fuhlbrigge, Ellington, CT (US); Carlos Martinez, West Hartford, CT (US); Heping Chen, Austin, TX (US); Gregory Rossano, Enfield, CT (US)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 14/067,549

(22) Filed: Oct. 30, 2013

(65) Prior Publication Data
US 2014/0052295 A1   Feb. 20, 2014

Related U.S. Application Data

(62) Division of application No. 13/061,245, filed as application No. PCT/US2008/010248 on Aug. 29, 2008, now Pat. No. 8,606,398.

(51) Int. Cl.
*B25J 9/16* (2006.01)
*B25J 13/08* (2006.01)
(Continued)

(52) U.S. Cl.
CPC ............ *B25J 9/1694* (2013.01); *B25J 9/1687* (2013.01); *B25J 13/085* (2013.01); *B25J 15/0019* (2013.01); *B25J 15/0052* (2013.01);
(Continued)

(58) Field of Classification Search
CPC ........ B25J 9/104; B25J 9/1045; B25J 9/1075; B25J 9/14; B25J 9/142; B25J 9/144; B25J 9/146; B25J 9/148; B25J 9/1615; B25J 9/1633; B25J 9/1635; B25J 9/1638; B25J 9/1674; B25J 9/1676; B25J 9/1692; B25J 19/068; B25J 19/091; B25J 15/0023
USPC .......... 700/213, 245, 256, 258; 901/2, 27–31, 901/45
See application file for complete search history.

(56) References Cited

U.S. PATENT DOCUMENTS

| 5,377,950 A | 1/1995 | Salcudean |
| 5,419,674 A | 5/1995 | Chang |

(Continued)

FOREIGN PATENT DOCUMENTS

| WO | WO 2007036280 A1 * | 4/2007 | ................. B25J 9/14 |
| WO | 2010024794 | 3/2010 | |

OTHER PUBLICATIONS

European Search Report, EP1217434, Munich, Sep. 11, 2012.
(Continued)

*Primary Examiner* — Jerrah Edwards
(74) *Attorney, Agent, or Firm* — Michael M. Rickin

(57) ABSTRACT

A robot is used to pick parts from a bin. The robot has a compliant apparatus and one or more tools are connected to the apparatus to perform the picking. The compliant apparatus has mechanisms for monitoring and/or controlling its compliance. The compliant apparatus can have various embodiments. Force sensing can be used during removal of grasped parts from the bin to determine the force exerted on the picking tool(s). The signal indicative of the exerted force can be used by the robot controller to determine the weight of the parts that may be held by the picking tool(s). The robot has one or more devices which can be the picking tool to stir the parts in the bin.

10 Claims, 19 Drawing Sheets

Robot Arm

R = Rigid
C = Compliance
P = Pressure or proximity sensor

(51) Int. Cl.
*B25J 15/00* (2006.01)
*B25J 15/04* (2006.01)
*B25J 17/02* (2006.01)

(52) U.S. Cl.
CPC ............ *B25J 15/04* (2013.01); *B25J 17/0208* (2013.01); *G05B 2219/39574* (2013.01); *G05B 2219/40035* (2013.01); *G05B 2219/40053* (2013.01); *G05B 2219/40537* (2013.01); *Y10T 74/20329* (2015.01)

(56) References Cited

U.S. PATENT DOCUMENTS

| | | | |
|---|---|---|---|
| 5,420,489 A | 5/1995 | Hansen | |
| 5,765,276 A | 6/1998 | Pichot | |
| 6,212,443 B1* | 4/2001 | Nagata et al. | 700/245 |
| 2005/0181707 A1* | 8/2005 | Wood | 451/11 |
| 2009/0108605 A1* | 4/2009 | Becker et al. | 294/88 |

OTHER PUBLICATIONS

Wolfenbuttel R F et al., "Multiaxis Compliant Capacitive Wrist Sensor for Use in Automated Assembly with Industrial Robots" Proceedings of the Instrumentation and Measurement Technology Conference. San Jose, Feb. 13-15, 1990:[Proceedings of the Instrumentation and Measurement Technology Conference], New York, IEEE, US, vol.—Feb. 13, 1990, pp. 54-59, XP000163859.

* cited by examiner

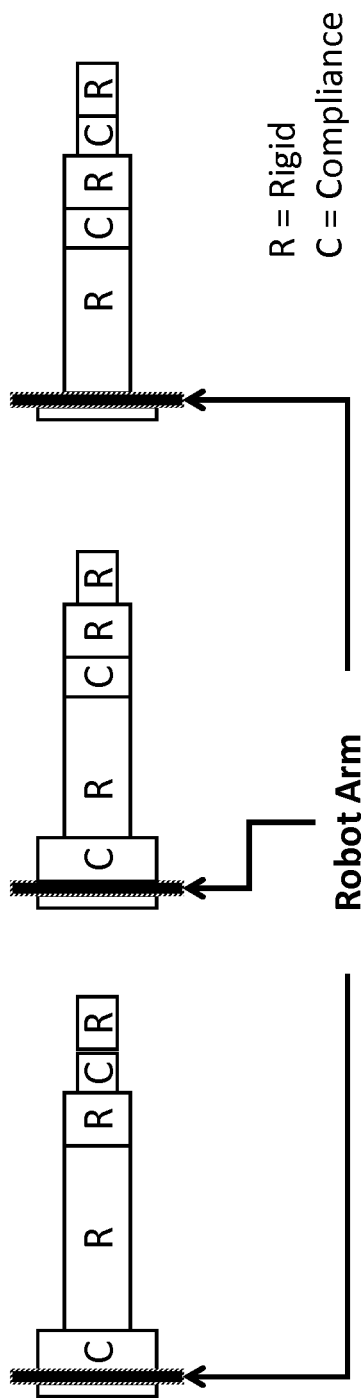
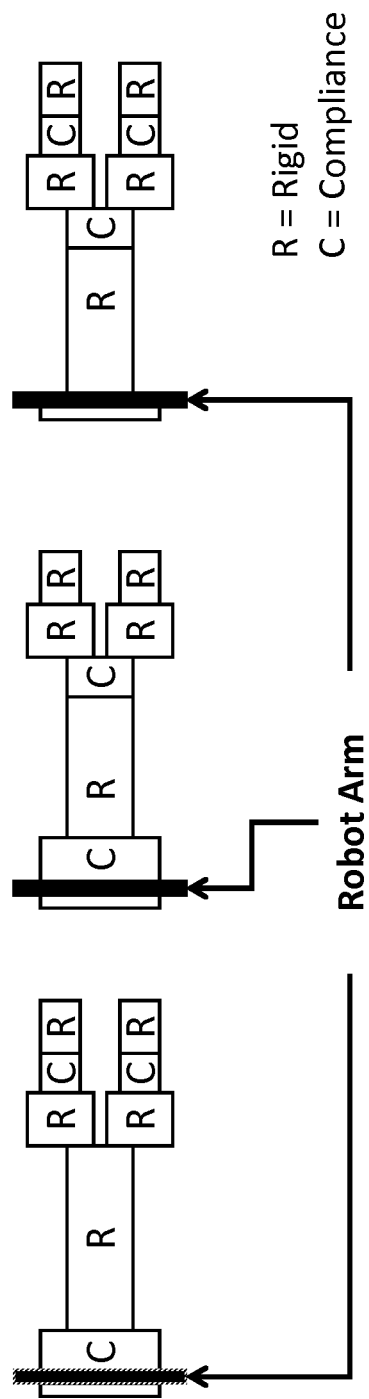

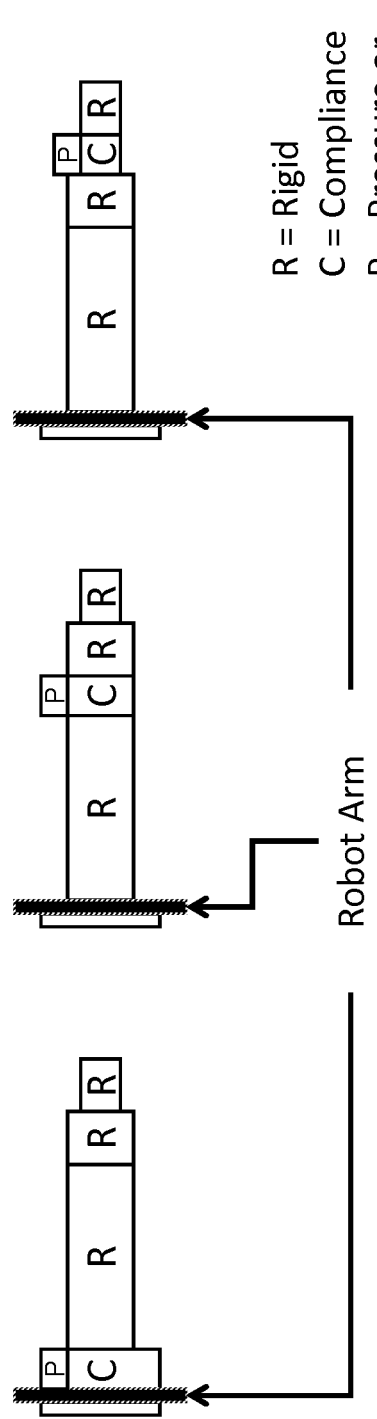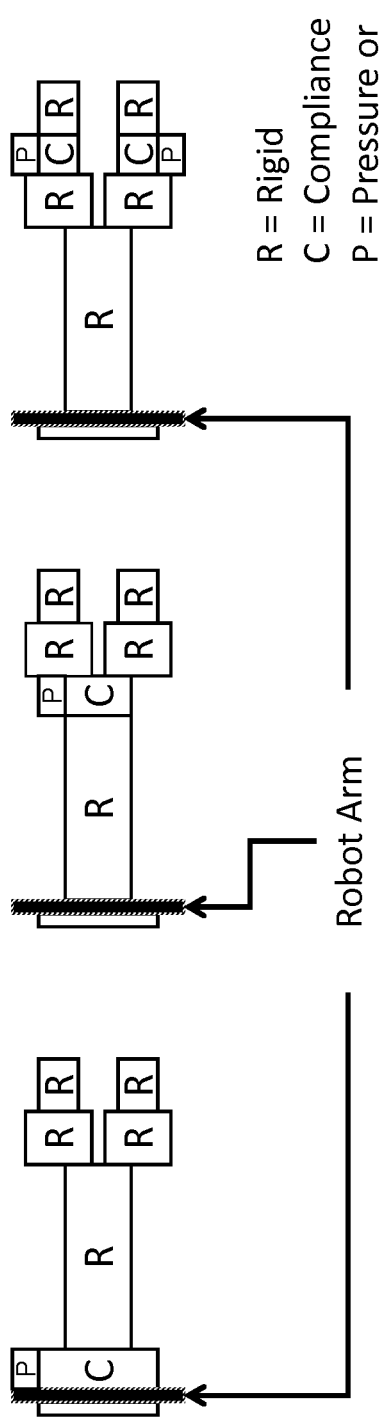
Fig. 11a
Fig. 11b

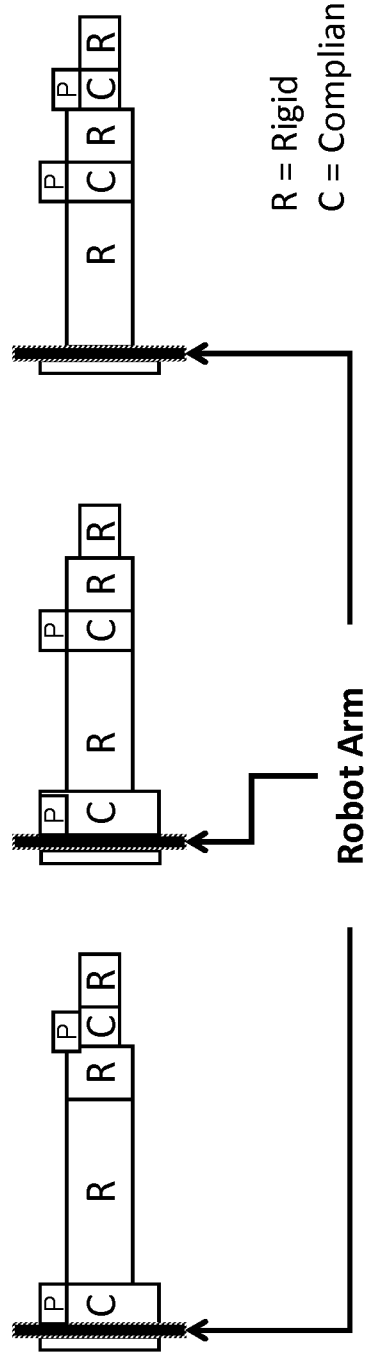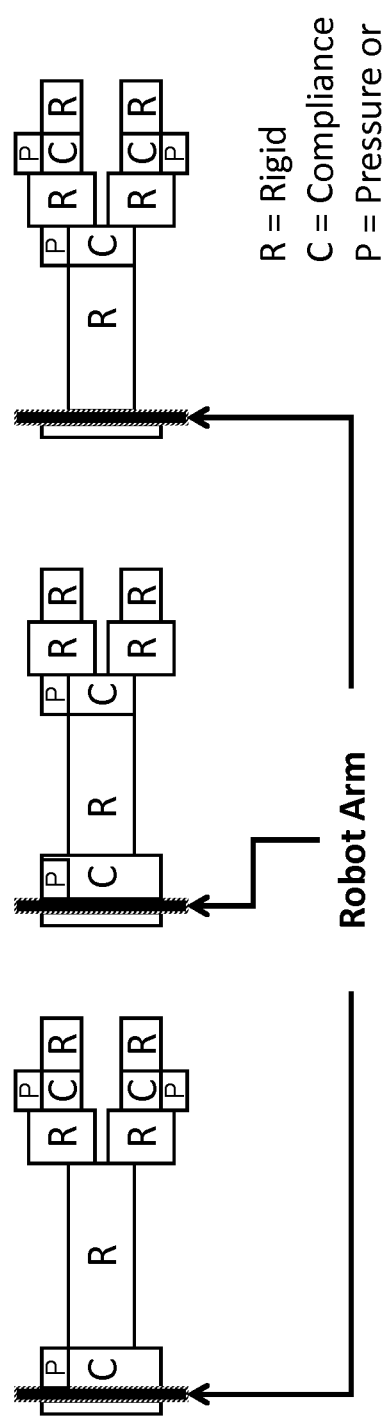

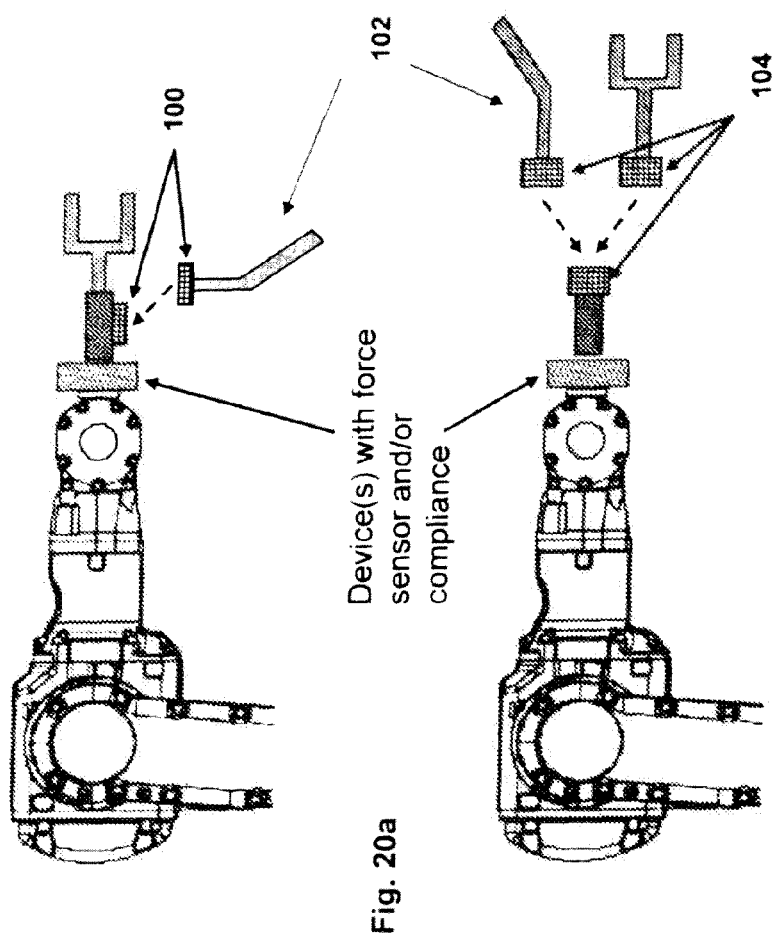

COMPLIANT END OF ARM TOOLING FOR A ROBOT

FIELD OF THE INVENTION

This invention relates to compliant end of arm tooling for a robot that can be used by the robot for applications such as picking parts from a bin.

DESCRIPTION OF THE PRIOR ART

Robots and other multi-axis manipulator systems are used in many industrial and commercial applications to perform precise and repetitive movements with minimum human intervention. For example, robots pick and place parts, apply spray paint, weld, remove burrs and apply sealant to joints. Properly programmed robots are highly repeatable and reliable tools.

One example of a prior art six-axis industrial robot manipulator that can be used for picking parts from a bin is shown in FIG. 1, and generally indicated by the numeral 10. Robot systems typically include a manipulator assembly 12 and a computer-based controller 14. The robot manipulator assembly 12 includes an upper arm 16a and lower arm 16b. The manipulator assembly 12 has one end mounted through first joint 18 to a base 20, and a wrist 22 on the opposite end. A grasping mechanism 24 is mounted to wrist 22 and is configured to receive a part. The grasping mechanism 24 and other devices such as a work-piece that are mounted to the robot wrist 22, are together known generally as an end-effector.

FIG. 1 also shows a vision system 36 having two cameras 38 and a bin 40 filled with parts 41 to be picked by robot 12 using grasping mechanism 24. As is well known, vision system 36 also has a computing device which is not shown in FIG. 1. The term "bin" as used herein means, without limitation, any container, carton, box, tray or other structure that can receive and hold parts.

The grasping mechanism 24, also known as an end of arm tool (EOAT), is a rigid component as it does not have any compliance. While the EOAT 24 is shown in FIG. 1 as only a single component, it is well known to those of ordinary skill in the this art to have an EOAT that consists of one or more rigid components one of which is attached to the robot arm 16a so that the robot 12 can move the EOAT to all desired positions. The type and kind of these rigid components depends on the needs and configuration of the bin picking system. When a picking system error occurs, the grasp of the part 41 by the EOAT fails and parts 41 are often damaged due to the rigidity of the EOAT 24.

The vision system 36 is used to determine the part location and orientation in the bin 40. The vision system shown in FIG. 1 is by way of example and not of limitation. That system could have more or less cameras, use laser lighting, have the cameras mounted on the robot 12 etc.

Extracting randomly arranged parts 41 from a bin 40 is a complex task that the robotics industry has been trying to automate for many years. Depending on the bin and part size, current solutions vary from dumping the parts 41 onto a flat area (in order to reduce the number of variables in the part position and orientation), using a bowl feeder or picking up the parts 41 manually. These solutions have various drawbacks, such as cost, failure rate, and lack of flexibility. Industrial robot manipulators are cost effective, reliable, and flexible, but have had limited success in bin picking applications because part locations and orientations are extremely variable and hard to identify.

The most accurate vision systems 36 are either too slow, or not accurate enough to guide an industrial robot 12 to reliably pick up complex parts 41 in uncontrolled 3D arrangements. Existing robotic bin picking systems have been successful typically with simple parts 41, simple bin arrangements such as shallow bins with only a few layers of parts 41, extremely customized equipment, and/or a very expensive vision system 36. However, system errors, including vision, often result in a failed grasp of the part 41 and/or collision.

Some current solutions use compliance to solve some of the above problems. However, in those solutions the compliance is limited to less than six degrees of freedom, and in those solutions the robot 12 or its tooling 24 is left in an unknown state, or expensive sensing means is required to determine the state.

There is a need for a low cost, generic robot bin picking system that can successfully pick up complex 3D parts that are randomly organized in a bin.

SUMMARY OF THE INVENTION

A compliant apparatus for use by a robot for picking of randomly distributed objects. The compliant apparatus has:
one or more rigid components in a predetermined arrangement with more than one compliant device, each of the more than one compliant devices providing compliance in one or more degrees of freedom to facilitate extraction of one or more of the objects from the bin, wherein each one of the more than one compliant device can have different amounts of compliance along different axes to provide more compliance in one or more degrees of freedom than in others.

A compliant apparatus for use by a robot for picking of randomly distributed objects. The compliant apparatus has:
one or more end points, each of the end points capable of picking up one of the objects; and
one or more rigid components in a predetermined arrangement with more than one compliant device, each of the more than one compliant devices providing compliance in one or more degrees of freedom to facilitate extraction of one or more of the objects from the bin, wherein each one of the more than one compliant device can have different amounts of compliance along different axes to provide more compliance in one or more degrees of freedom than in others.

A compliant part picking apparatus for use by a robot having an end effector to pick one or more parts from a bin having one or more of the parts therein. The compliant part picking apparatus has:
a tool for picking one or more of the parts from the bin;
at least one rigid component connected to the picking tool; and
at least one compliant component having at least one degree of freedom connected to the at least one rigid component and the robot end effector, the compliant component having a controllable compliance to adjust both the position and orientation of the tool when the tool is picking one or more of the parts in the bin from the bin.

DESCRIPTION OF THE DRAWING

FIGS. 8, 9, 10a and 10b show how the compliance device in an end of arm tool can be arranged when there are one or more grasp points and one or more compliance devices.

FIGS. 11a and 11b and 12a and 12b show how for each of the three embodiments shown in FIGS. 8, 9, 10a and 10b, respectively, the compliance devices and sensors can be arranged when there are one or more grasp points, one or more compliance devices and one or more sensors.

FIGS. 20a and 20b show for the robot 12 shown in FIGS. 17a and 17b, respectively, an embodiment where the robot also has either force sensing or a compliance device between the robot and the tooling.

DETAILED DESCRIPTION

Figure 2:
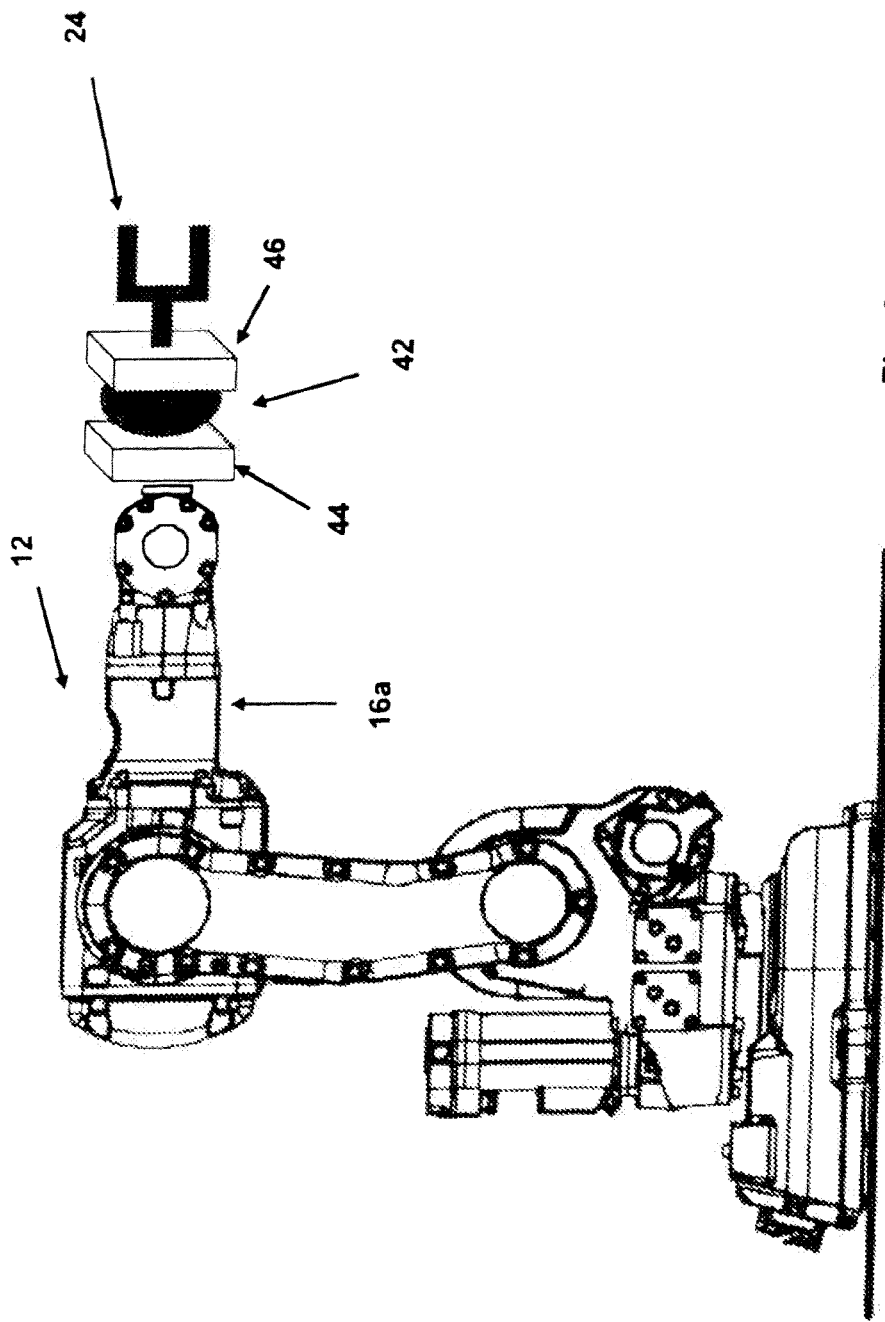
FIG. 2 shows one embodiment for a compliant end of arm tool that can be used for picking parts from a bin.
Figure 3:
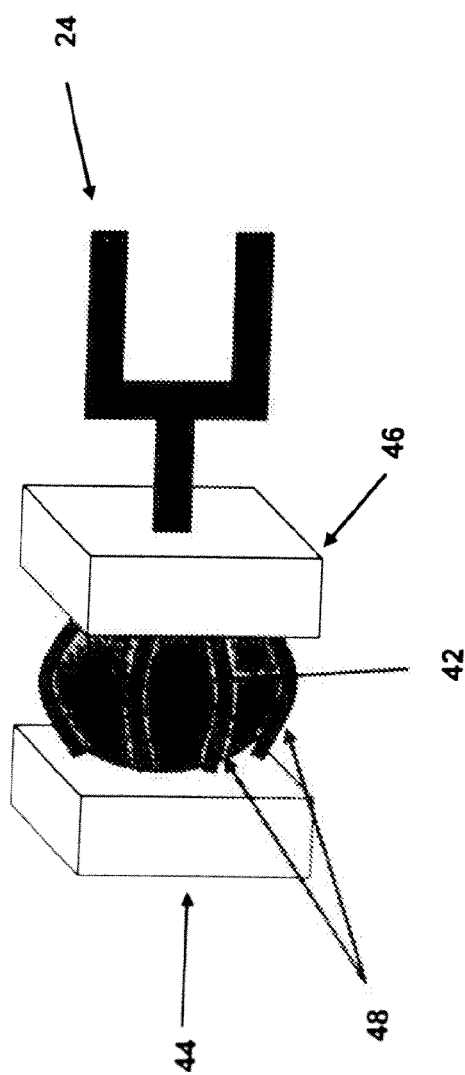
FIG. 3 shows the compliant end of arm tool of FIG. 2 with limiting devices to control the amount of compliance in various directions.

Referring now to FIG. 2, there is shown one embodiment of the present invention that has a compliance device with multiple degrees of freedom. As is shown in FIG. 2, this compliance device 42 can be implemented by filling a rubber tube or bladder with pressurized air, and placing the device 42 between the robot arm 16a and the gripper 24. As is shown in FIG. 2, the bladder 42 is sandwiched between plates 44 and 46. As is shown in FIG. 3, a tether which can without limitation be an industrial fabric or cables or chains 48 or other limiting device can be used to maintain a minimum amount of pressure between the plates 44 and 46 that contain the tube or bladder 42, while still allowing the tube or bladder 42 to be compressed in any direction. The fabric, cables, chains 48 or other limiting devices can control the amount of compliance in various directions. Optionally, simple rails, joints or other devices can be added to this configuration to limit the compliance to less than six degrees of freedom. The tethers help hold the compliant device in its default configuration until external forces or torques exceed a predetermined amount. After the external forces or torques are reduced below a predetermined amount, the device returns to its original configuration with the help of the tethers.

Figure 1:
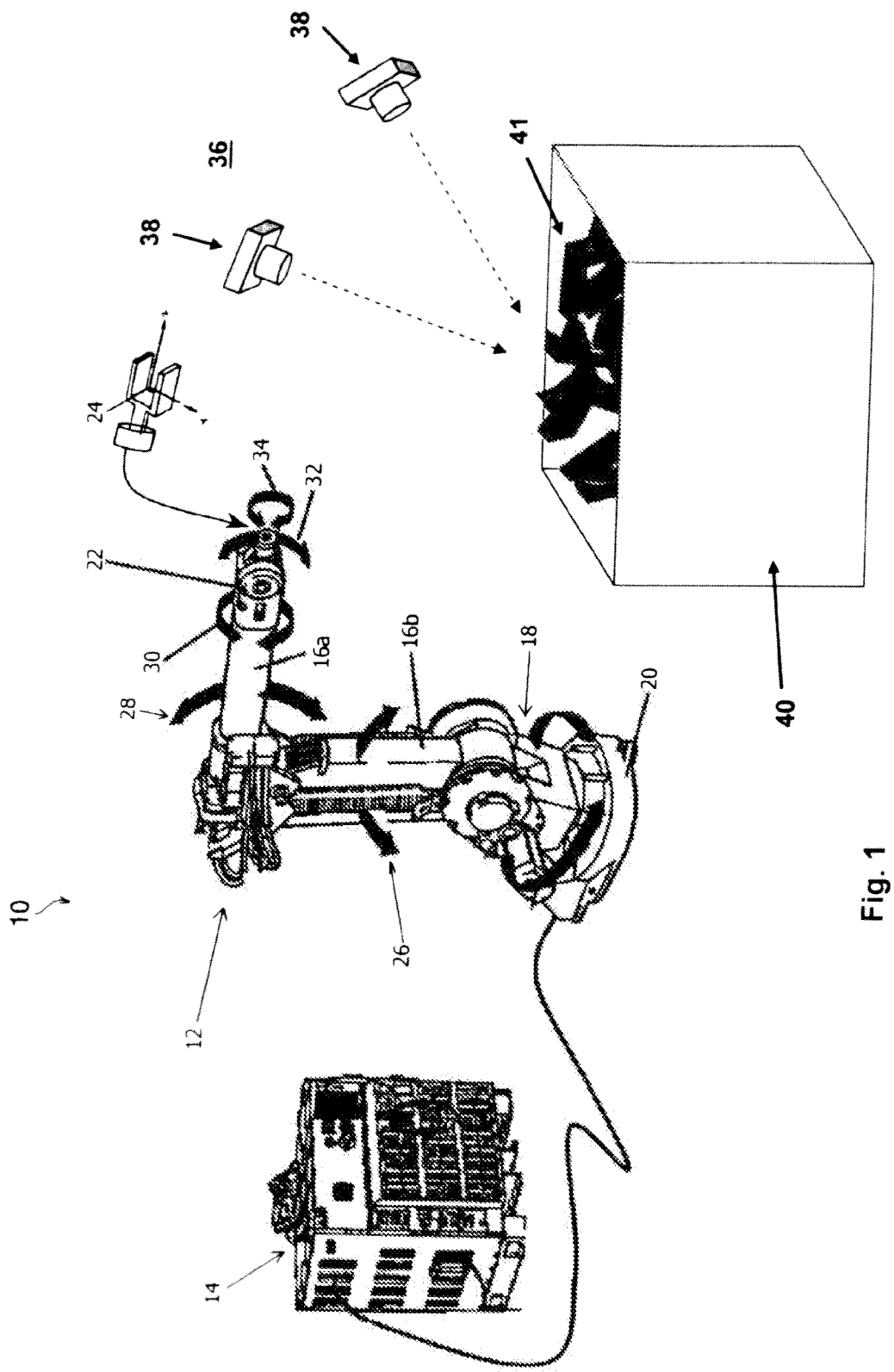
FIG. 1 shows a prior art robot manipulator that can be used to pick parts from a bin.

When, in the embodiment shown in FIG. 2, the vision system 36 (see FIG. 1) identifies a part 41 inside a bin 40 (also shown in FIG. 1), the part location and orientation are sent to the robot controller 14. The robot controller 14 moves the EOAT 24 inside the bin 40 in order to grasp and extract the selected part 41. When the robot arm 16a moves the EOAT 24 to the selected part 41, this part might be offset from the expected position. The up to six degrees of compliance provided by device allows the EOAT's position and orientation to adjust slightly to get a better grasp. Having the compliance up to six degrees of freedom allows the system to compensate for a larger variety of errors, especially misalignments. The compliance also reduces damage to the robot 12, tool 24, bin 40 and the parts 41 when collisions occur due to position or orientation errors.

Figure 4:
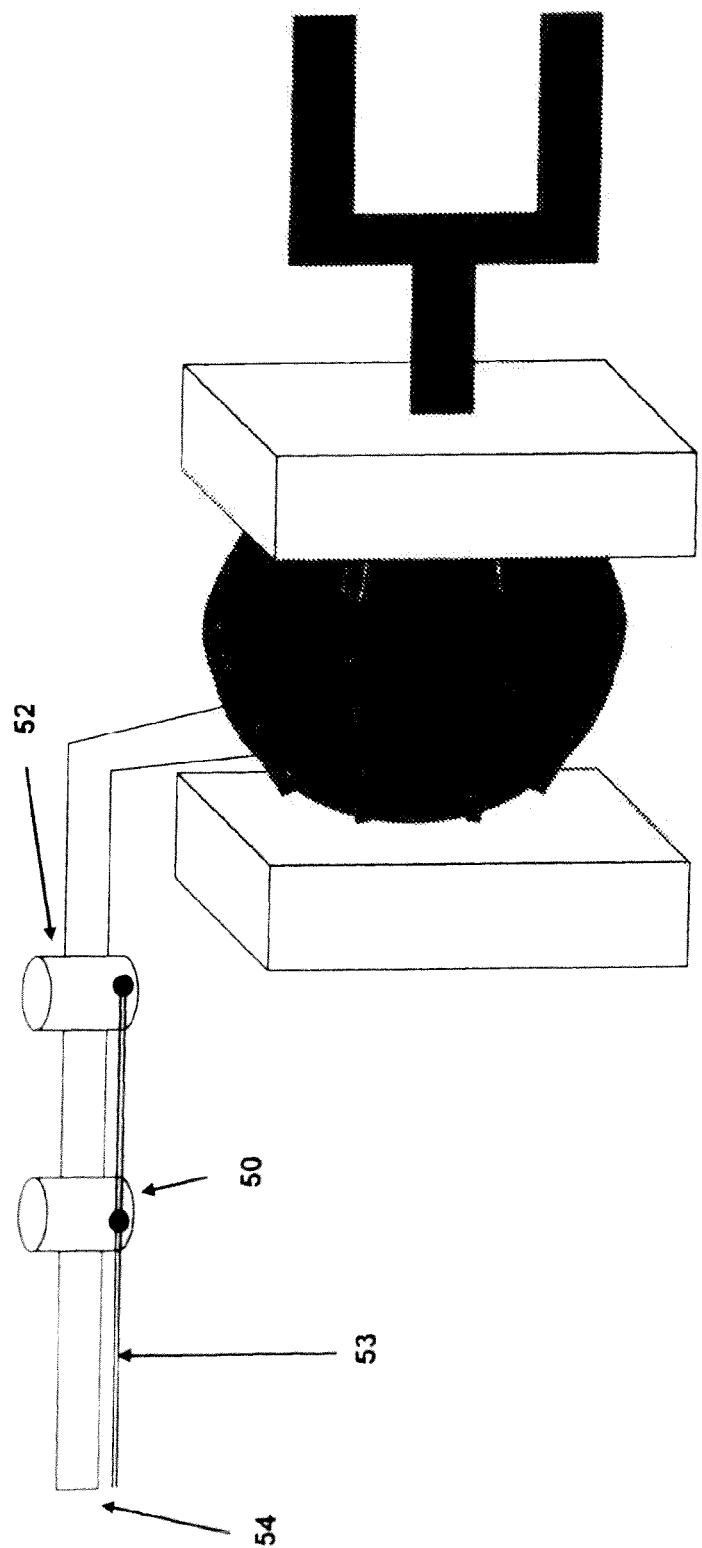
FIG. 4 shows an embodiment for a compliant end of arm tool that has dynamically adjustable air pressure.

Various air pressures can be used to make the device shown in FIGS. 2 and 3 more or less compliant. One embodiment for a dynamically adjustable air pressure compliant device 42 is shown in FIG. 4. In that embodiment, the tubing 54 connected to the bladder 42 through which the air flows has in series a valve 50 to increase or decrease the air pressure to the bladder 42 and an air pressure sensor means 52 that may be an air pressure sensor or a limit switch. The air pressure sensor gives a range of values for the current pressure, whereas the air pressure limit switch is a binary output (1=the pressure is above the limit; 0=below the limit). Input/output signals 53 to and from controller 14 are used to control the air pressure to bladder 42.

The pressure limit switch 52 monitors the pressure in the device 42 so that extreme pressures trigger the limit switch 52. When a large error occurs in the bin picking application, the forces due to a collision are large enough to trigger the predefined limit. Alternatively, the forces are monitored by the pressure sensor 52 instead of a limit switch. Either sensor means causes the robot motion to be stopped when the air pressure limit is reached and before any damage has occurred. This allows the system to safely stop and automatically attempt another pick. Similarly, the part placement motion (which occurs after the part 41 has been picked) can also be monitored and adjusted based on the same pressure sensors 52 and the auto recovery method described above, i.e. stopping the robot motion and automatically attempting another pick. Of course, if a part 41 is in the gripper 24 when an error occurs that initiates the auto recovery then the robot 12 must do something with that part, for example, drop the part 41 into the bin 40, before attempting another pick.

As part of this system, the pressure sensor or sensors can also be active during the retract motion as the part 41 is being removed from the bin 40. Other limits can be used to detect that the grasped part 41 has become stuck. This can happen for various reasons, such as the grasped part 41 interlocking with other parts 41 or being caught between the bin wall and other parts. When such a limit is reached during the retract motion, the robot 12 can either release the part or try to remove it from a different direction.

As the robot 12 pulls the selected part 41 from the bin 40, the pressure sensing device 52 will register higher and higher pressures when a part 41 is stuck or blocked. In such circumstances, the robot 12 can systematically pull in other directions until it finds one direction with acceptably less resistance. The process can be repeated every time resistance is met. The process is stopped, and the part released, if no low resistance path can be found. The process is stopped if a time limit, search attempt limit, or other constraint is reached. These constraints prevent an infinite loop, where the part 41 is constantly being moved back and forth between a few positions. The air pressure in the compliance device 42 can also be adjusted during the search to help free the part or allow a change in the gripper orientation.

Figure 5:
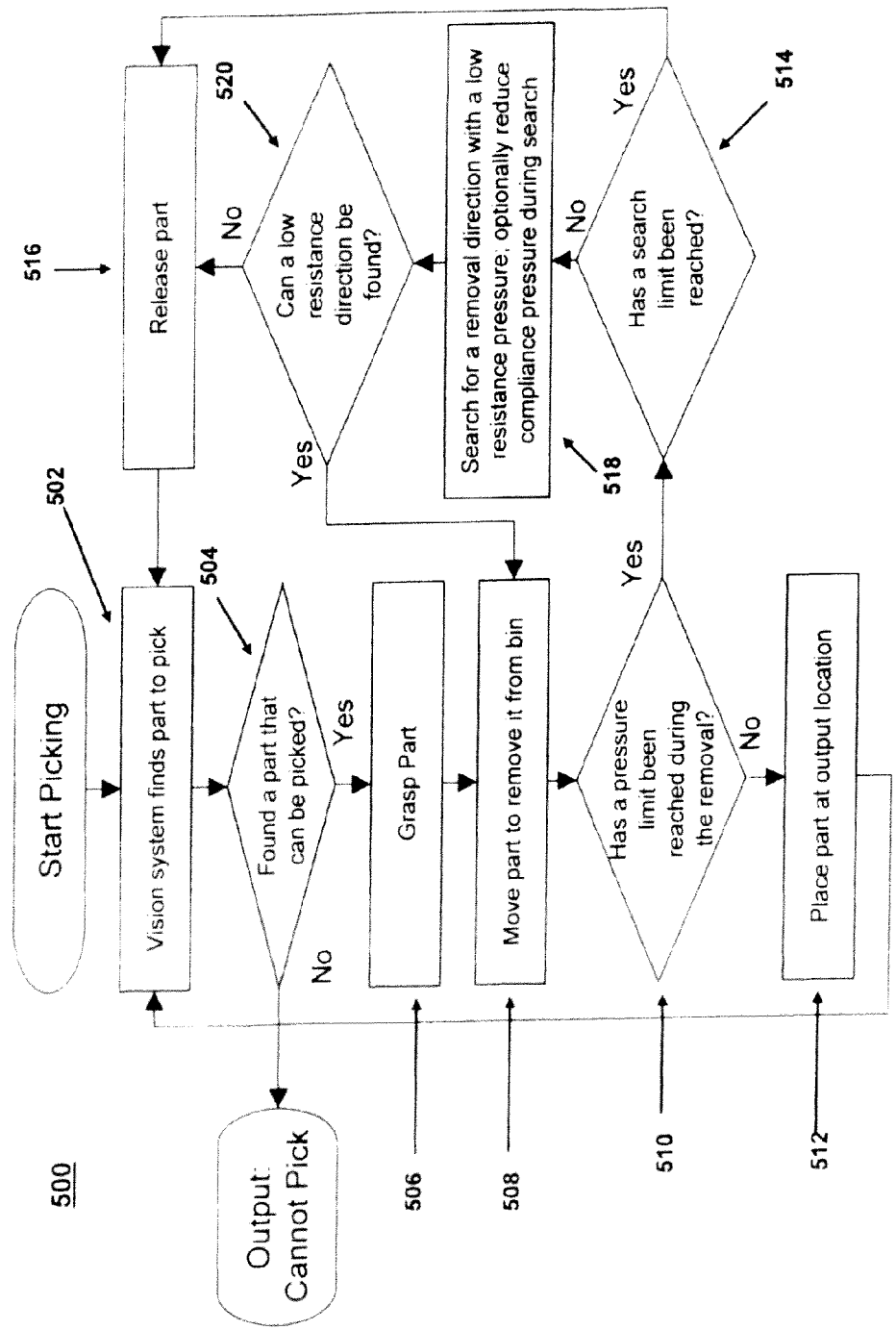
FIG. 5 shows a flowchart for a robot that has the compliant end of arm tool shown in FIG. 4.

Referring now to FIG. 5, there is shown a flowchart 500 for a robot that has the compliance device 42 shown in FIG. 4. In block 502, the picking starts with the vision system 36 associated with robot 12 looking for a part 41 that can be picked from bin 40. Decision 504 asks if a part 41 that can be picked was found. If the answer is no, the picking process is ended.

If the answer to decision 504 is yes, then in block 506 the part 41 is grasped and in block 508 the grasped part 41 is moved to remove it from the bin 40. Decision 510 asks if a pressure limit was reached during the removal of the part 41 from the bin 40. If the answer is no, then in block 512 the robot 12 places the part 41 at the location where it was meant to be placed.

If the answer to decision 510 is yes, then the process proceeds to decision 514 which asks if a search limit has been reached. If the answer is yes, the process proceeds to block 516 where the part 41 is released and then proceeds to block 512 to look for a part 41 to pick from bin 40.

If the answer to decision 514 is no, the process in block 518 searches for a removal direction with a low resistance pressure and may optionally reduce the compliance pressure during the search. After completing block 518 the process proceeds to decision 520 where it is asked if a low resistance direction can be found. If the answer to decision 520 is yes, the process proceeds to block 508 where the part 41 is moved so that it can be removed from the bin 40. If the answer to decision 520 is no, the process proceeds to block 516 where the part 41 is released.

In the embodiment of the present invention described above which uses air pressure to control the compliance, the air pressure can be dynamically altered in the compliance device during the bin picking process. When a collision occurs, the forces between the robot's tooling and the bin 40 or parts 41 normally remain high, even after the robot 12 stops. These forces can cause motion errors when the robot 12 restarts and attempts to retract from the collision point. These forces can be reduced, making the robot 12 free to move, by reducing the air pressure in the compliance device 42 after a collision and then restoring it after the robot 12 has retracted from the collision point.

Figure 6:
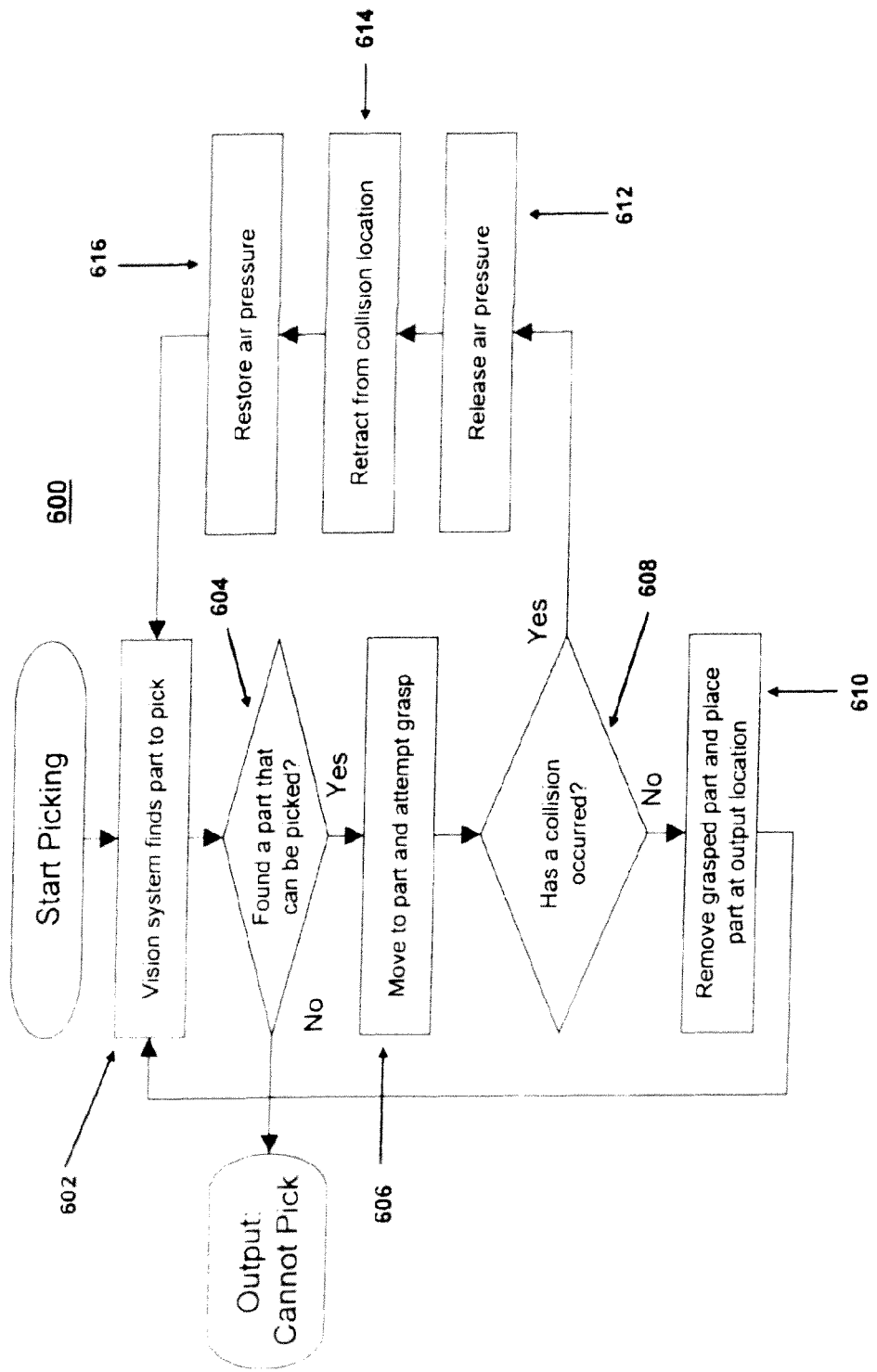
FIG. 6 shows a flowchart for the dynamic altering of air pressure for the compliant end of arm shown in FIG. 4.

The flow chart 600 shown in FIG. 6 describes this dynamic altering of the air pressure. In block 602, the picking starts with the vision 26 system associated with robot 12 looking for a part 41 that can be picked from bin 40. Decision 604 asks if a part 41 that can be picked was found. If the answer is no, the picking process is ended.

If the answer to decision 604 is yes, then in block 606 the robot 12 moves to the part 41 and attempts to grasp it. Decision 608 asks if a collision has occurred in the grasping of the part 41. If the answer to decision 608 is no, the robot 12 in block 610 removes the grasped part 41 from bin 40 and places it at the output location.

If the answer to decision 608 is yes, then in block 612 the air pressure is released. After the air pressure is released, then, as described in block 614, the robot 12 is retracted from the collision location. In block 616 the air pressure is restored and the vision system 26 is, as described in block 602, used to find a part 41 that can be picked from bin 40.

Figure 7:
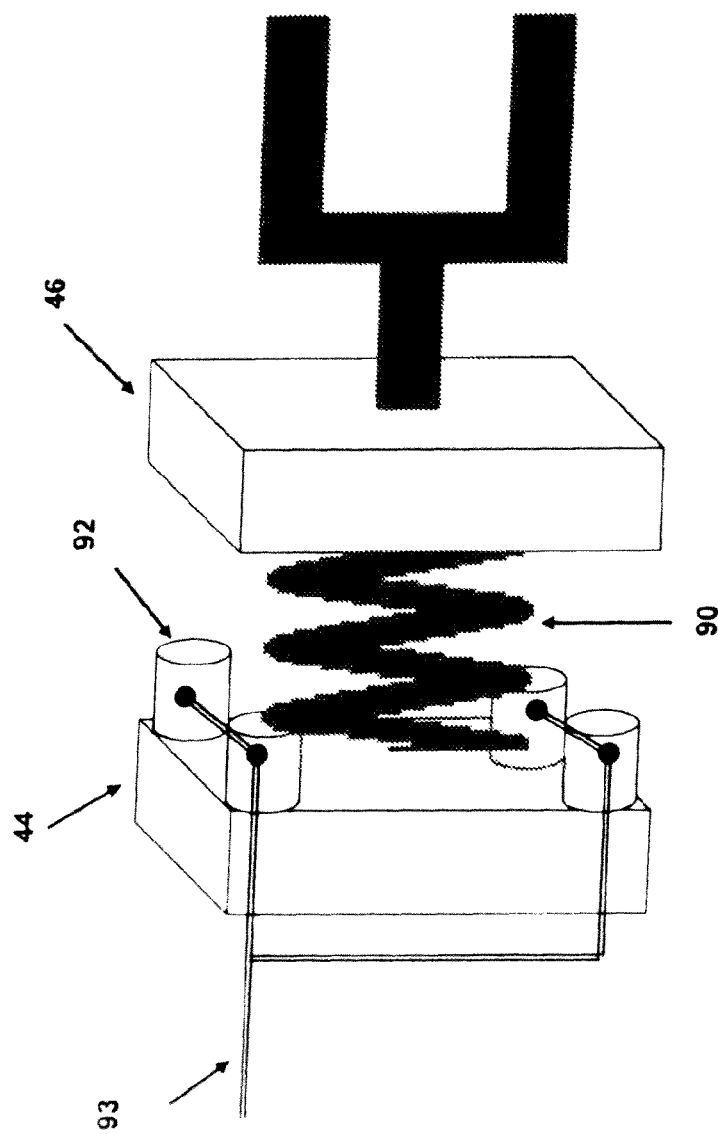
FIG. 7 shows a compliant end of arm tool that uses a spring or other compressible material.

Instead of a rubber tube or bladder 42 for the compliance device as shown in FIGS. 2-4, the compliance device may as shown in FIG. 7, be a spring or compressible material 90. Using a spring or compressible material as the compliance device simplifies the construction of the EOAT 24, but eliminates the possibility of dynamically changing the amount of compliance. The one or more springs (or similarly compliant materials or devices) provide compliance between the robot and the gripper along one or more axes. In this system, compliant motion, that is, the movement of one of the plates 44, 36 relative to the other of the plates 44, 46, is detected by using range or proximity sensors (or the like) 92. The sensors provides signals to the controller 14 and receive signals from the controller, these signals collectively designated as 93. One or more of these sensors 92 are used to detect the magnitude of the deflection along one or more axes.

In bin picking, the compliance in the device shown in FIG. 7 gives some tolerance to position errors during a pick operation, allowing the tooling to shift slightly and grip the part 41 when the errors are small. In the case of large errors, the forces due to a collision are large enough to trigger predefined limits. The forces are indirectly monitored by the range or proximity sensors 92 in the device, and the robot motion is stopped when the limit is reached and before any damage has occurred. This allows the system to safely stop and automatically attempt another pick. Similarly, the part placement motion (which occurs after the part 41 has been picked) can also be monitored and adjusted based on the same range or proximity sensors 92 and auto recovery method.

As part of this system, the range or proximity sensor(s) 92 can also be active during the retract motion as the part 41 is being removed from the bin 40. These sensors 92 can be used to detect that the grasped part 41 has become stuck. This can happen for various reasons, such as interlocking with other parts or being caught between the bin wall and other parts. When such an event occurs during the retract motion, the robot 12 can either release the grasped part 41 or try to remove it from a different direction. The same procedure described above for the pressure sensing system can be performed using the range/proximity sensing system.

Parts could become interlocked with each other, entangled, and/or obstructed. To facilitate a successful extraction of such a part, the EOAT's compliance allows a grasped part 41 to reorient during the extraction, increasing the pick success rate by allowing an interlocked, entangled, and/or obstructed part to adjust and free itself.

The above embodiments can be further modified to support various configurations. Compliance in multiple directions can also be achieved by using multiple compliance devices, each with one or more degrees of freedom (spring, air bags, cylinders, etc), linked to the rigid components. Depending on the EOAT configuration and the system needs, the compliance can be located between any of the rigid components. Multiple compliance devices can be used to improve compliance in one or more directions.

Figure 8:
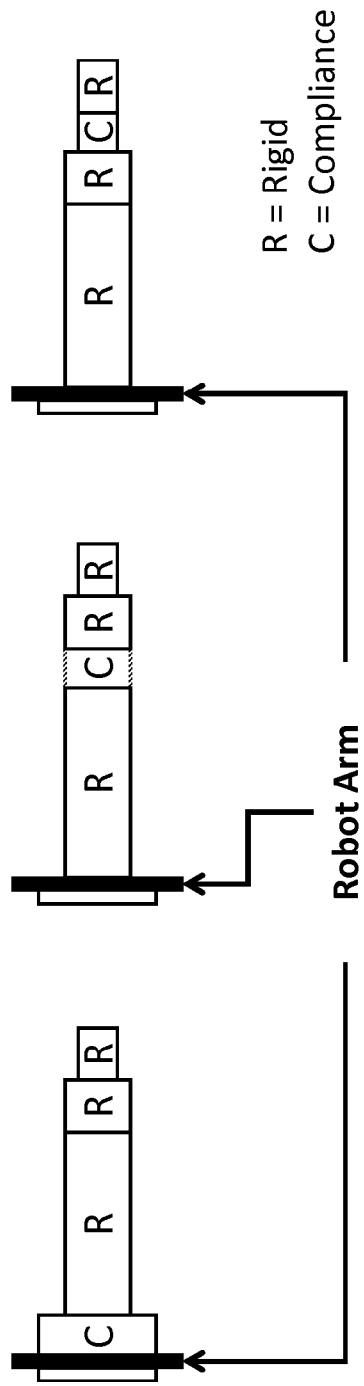
Figure 9:
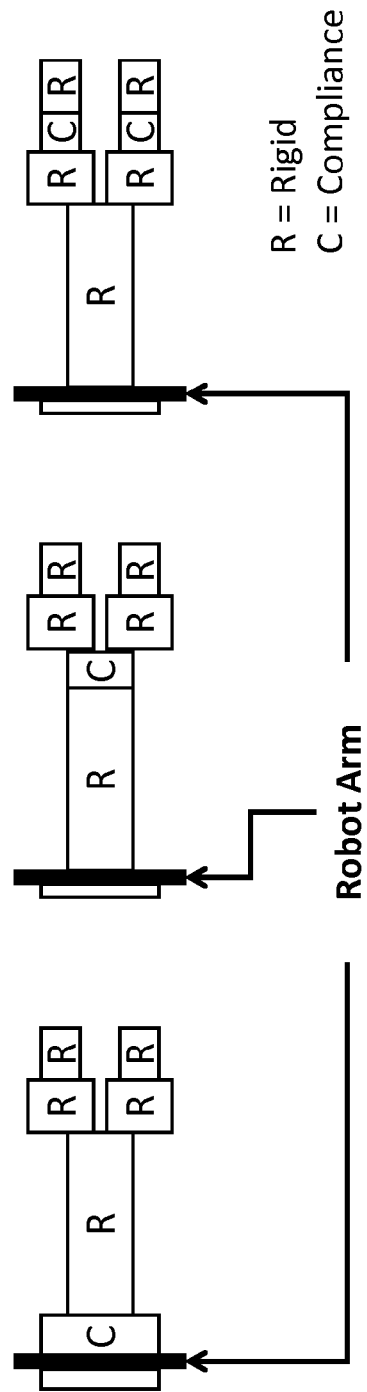

FIGS. 8-10 show how the compliance devices in an EOAT can be arranged when there are one or more grasp points and one or more compliance devices. In each figure, the rigid component is designated by the letter "R" and the compliant component is designated by the letter "C". In each figure, the robot arm is shown in each EOAT at the left hand side of the EOAT and the rigid grasping component R is at the right hand side of each EOAT.

FIG. 8 shows three EOATs each with a single grasp component. FIG. 9 shows each of the EOATs of FIG. 8 with two grasp components. FIG. 10a shows the EOATs with the single grasp component of FIG. 8 with two compliance devices and FIG. 10b shows the EOATs with two or more grasp components of FIG. 9 with two compliance devices. It should be appreciated that while only two grasp components are shown in FIGS. 9 and 10b and only two compliance devices are shown in FIGS. 10a and 10b, those EOATs can have more than two grasp components and more than two compliance devices.

The above embodiments can be further enhanced to provide an inexpensive force sensing means. Current compliance solutions can leave the robot or its tooling in an unknown state, or require expensive sensing means to determine the state. For instance, rubber padding or a spring will flex during accidental contact, but little is known about where and how the compliance device has moved. This lack of knowledge prevents the robot system from providing an intelligent response to the error. This limitation can be overcome by adding as shown in FIG. 4 air pressure sensors to the air-based compliance embodiment of the present invention, or as shown in FIG. 7 range or proximity sensors to the other embodiments of the present invention. These sensors are far cheaper than multi-directional industrial force sensors. The pressure sensing mechanism could be analog, providing a continuous range of values, or one or more digital sensors, detecting when one or more discrete limits have been reached. The range or proximity sensors could also be used with the air-based compliance devices, in addition to or without the air pressure sensors.

The above compliance and sensor configurations provide an inexpensive way to be both tolerant of position errors in contact applications such as bin picking, and monitor forces for automatic and intelligent responses to several process and error conditions.

Additional embodiments could combine compliant devices and corresponding sensors described above to allow for compliance along one or more axes, including rotation. These combinations could allow the amount of compliance and measurement thresholds to be customized independently, such that one axis can move more and another less.

FIGS. 11a and 11b and 12a and 12b show how for each of the three embodiments shown in FIGS. 8, 9, 10a and 10b, respectively, the compliance devices and sensors can be arranged when there are one or more grasp points, one or more compliance devices and one or more sensors. In each figure, the rigid component is designated by the letter "R", the compliant component is designated by the letter "C", the sensor is designated by the letter "P" and the robot arm is shown on the left hand side of each embodiment. FIGS. 12a and 12b show the compliance and measurement devices in series.

Figure 14:
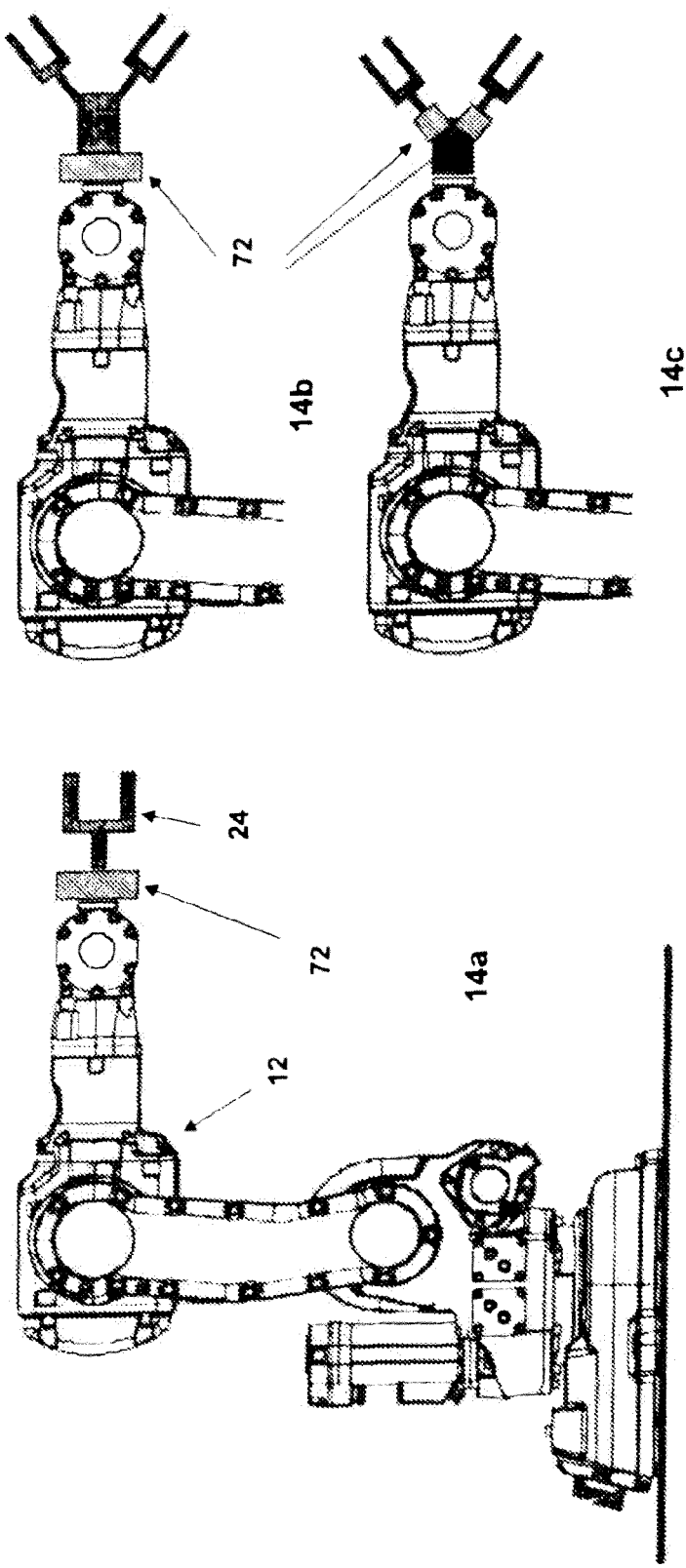
FIGS. 14a, 14b and 14c show various embodiments for a robot using such force sensing to pick parts from a bin.

Adding force sensing to the robot can allow the robot 12 to pick up partially obstructed or entangled parts by allowing the robot 12 to sense in which direction the part 41 can be moved to free it from the other parts. FIGS. 14a, 14b and 14c described in detail below show various embodiments for a robot 12 using such force sensing.

Figure 13:
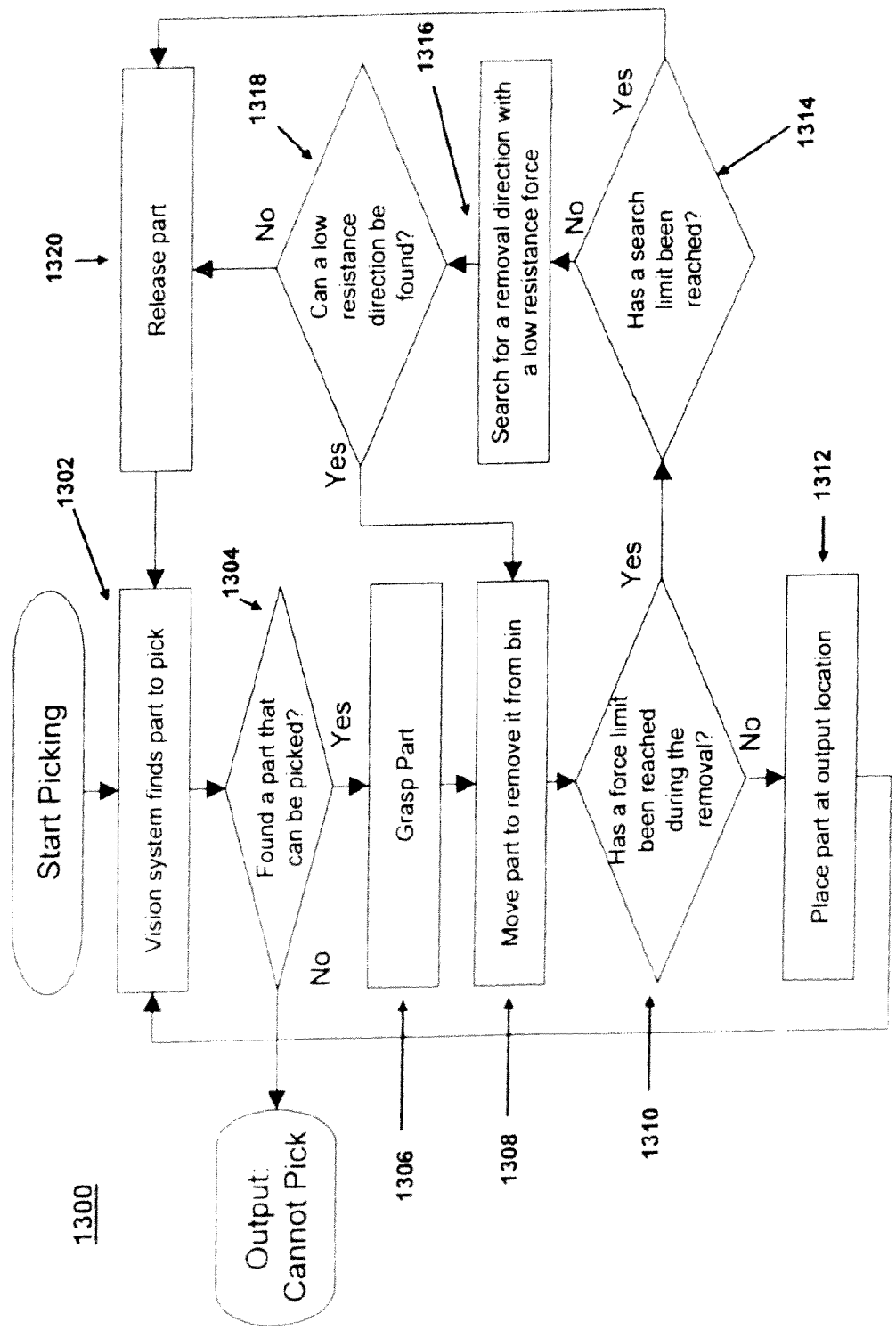
FIG. 13 is a flowchart for a robot that uses force sensing to pick parts from a bin.

As the robot 12 pulls the selected part 41 from the bin 40, the force sensing device registers higher and higher forces when a part 12 is stuck or blocked. In such circumstances, the robot 12 can systematically pull in other directions until it finds one direction with acceptably less resistance. The process can be repeated every time resistance is met. The process is stopped, and the part released if no low resistance path can be found. The process is also stopped if a time limit, search attempt limit, or other constraint was reached. These constraints prevent an infinite loop, where the part is constantly being moved back and forth between a few positions. The flowchart 1300 in FIG. 13 shows this procedure.

At block 1302, the vision system 36 finds a part 41 to pick from bin 40. The process proceeds to decision block 1304 where it is asked if the vision system 36 has a found a part 41 that can be picked from bin 40. If the answer is no, a "cannot pick" signal is output to the controller 14 or other computing device. If the answer to the question in decision block 1304 is yes, the process proceeds first to block 1306 where the gripping mechanism 24 grasps the part 41 and then to block 1308 where the robot moves the grasped part 41 in a manner so that it is removed from bin 40.

The process then proceeds to decision block 1310 where it is asked if a force limit has been reached during the removal of the grasped part 41 from bin 40. If the answer to that question is no, the removed part 41 is placed at a location where it can be used in another operation. The process then returns to block 1302 to find another part 41 to pick from bin 40.

If the answer to the question in decision block 1310 is yes, that is, a force limit has been reached in the removal of the grasped part 41 from bin 40, the process proceeds to decision block 1314 where it asks if a search limit has been reached. If the answer to this question is yes, the process proceeds to block 1320 and the grasped part is released and remains in the bin 41.

If the answer to the question in decision block 1314 is no, the process proceeds to block 1316 where a search is made for a removal direction with a low resistance force. This search is necessary because to reach block 1316 the process has had a yes answer at decision block 1310 to the question has a force limit been reached during the removal of the picked part 41. The process then proceeds from block 1316 to decision block 1318 where it is asked if a low resistance direction can be found. If the answer to this question is yes, the process returns to block 1308 to move the grasped part 41 to thereby remove it from bin 40. If the answer to the question in decision block 1318 is no, that is a low resistance direction for removing the grasped part 41 from the bin 40 cannot be found then the process proceeds to block 1320 where the grasped part is released.

The forces can be accurately measured either by using as is shown in FIG. 14a, a rigid force sensing device 72 attached between the robot 12 and the tool 24 that grips the parts 41, or by monitoring in a manner well known to those of skill in this art the robot's motor torques. If multiple grippers 24 are used, then as is shown in FIG. 14b, a single force sensor 72 can be used for both grippers 24, or as is shown in FIG. 14c a force sensor 72 can be used for each gripper 24.

Force sensing during removal can also be used to detect when a part 41 was successfully picked bin 40 and if the part 41 was dropped. It can also be used to determine if more than one part 41 was picked up. Multiple parts can be picked up accidently due to the interlocking of part features. In many applications, delivering an additional part can cause serious errors. Detecting the picking of multiple parts, and making an attempt to drop the additional part(s) without dropping the desired part, can improve production efficiencies.

Figure 15:
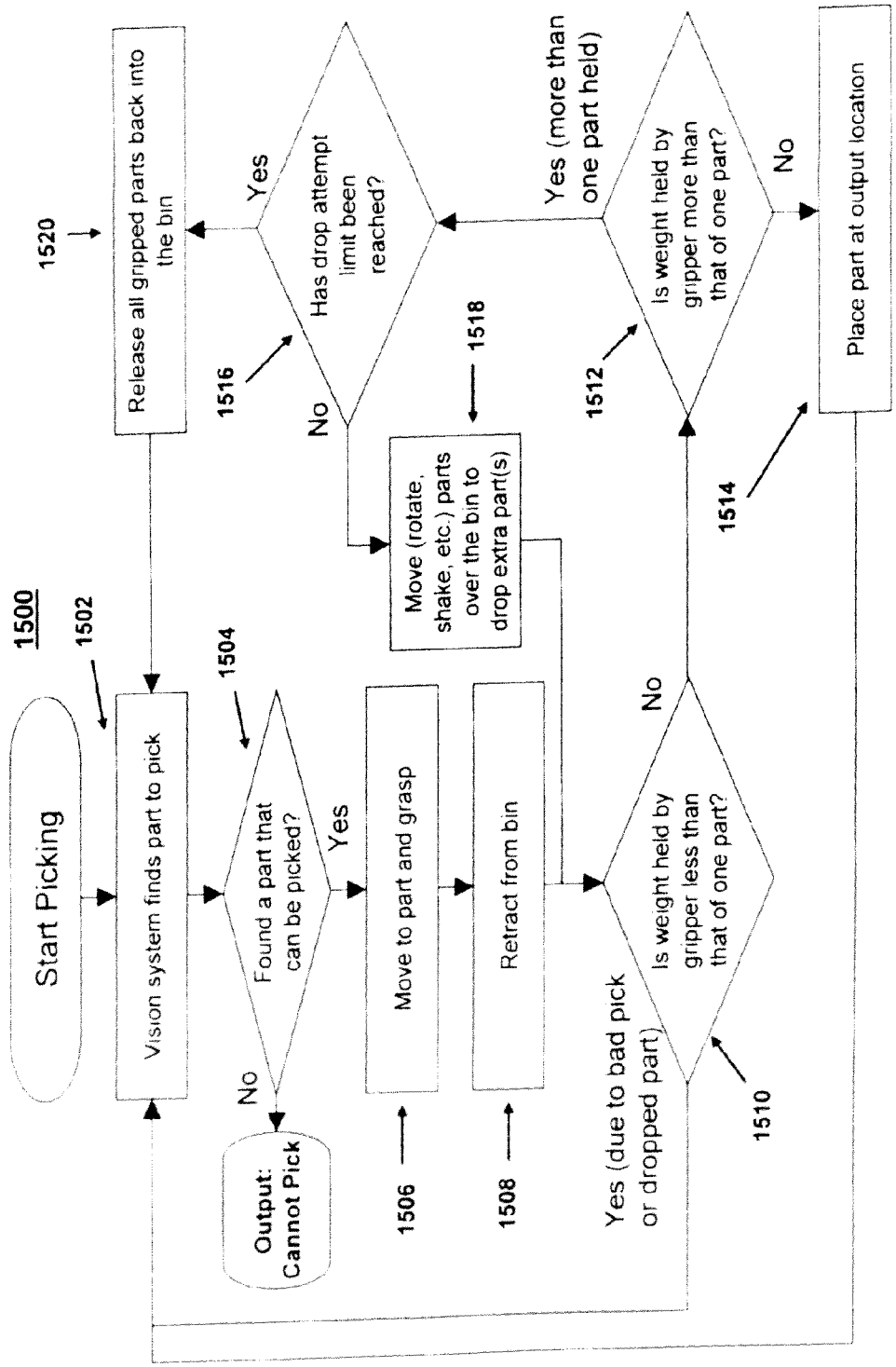
FIG. 15 is a flowchart for the procedure for ensuring that only one part is picked from bin.

Referring now to FIG. 15, there is shown a flowchart 1500 that describes the procedure for ensuring that only one part 41 is picked from bin 40.

Block 1502, 1504 and 1506 in this procedure are identical to blocks 1302, 1304 and 1306 in the flowchart 50 shown in FIG. 13 and thus their function need be described again. At block 1508, the gripper 24 is retracted from bin 40. The gripper 24 should be grasping a part 41 and thus at decision block 1510 there is asked if the weight held by gripper 24 is less than the weight of one part 41. The weight of what the gripper 24 is holding is determined by the controller 14 from the signals received by the controller from force sensor 72. If the answer is yes, this means that gripper 24 has not grasped a part 41. Therefore the procedure returns back to block 1502 to begin again the picking process.

If the answer to the question in decision block 1510 is no, then the gripper 24 is holding at least one part. The process then proceeds to decision block 1512 where it is asked if the weight held by gripper 24 is more than the weight for one part 41. The answer to this question determines if the gripper 24 is holding only one part 41 or has gripped two or more parts. If the answer to the question in decision block 1512 is no, then the gripper 24 is holding only one part 41 and the process proceeds to block 1514 where the gripped part 41 is placed at a location where it can be used in another operation. The process then returns from block 1514 to block 1502 to find another part 41 to pick from bin 40.

If the answer to the question in decision block 1512 is yes, then the process proceeds to decision block 1516 where it is asked if the predetermined drop attempt limit has been reached. This question is asked to prevent the robot 12 from continuously repeating the picking process. The predetermined drop attempt limit could, for example, be timed based or the number of attempts to shake the parts free. If the answer to question in block 1516 is no, the process proceeds to block 1518 where the grasped parts are moved or rotated or shaken over the bin 40 so that the extra parts are hopefully dropped back into bin 40. If the answer to the question of decision block 1516 is yes, the process proceeds to block 1520 where all of the gripped parts are released back into bin 40.

While FIGS. 14a, 14b and 14c have shown a rigid end of arm tool that is on a robot that uses force sensing or motor torque for picking parts from a bin, it should be appreciated that the end of arm tooling may also be compliant and have one of the embodiments described above and shown herein for such tooling.

Figure 16:
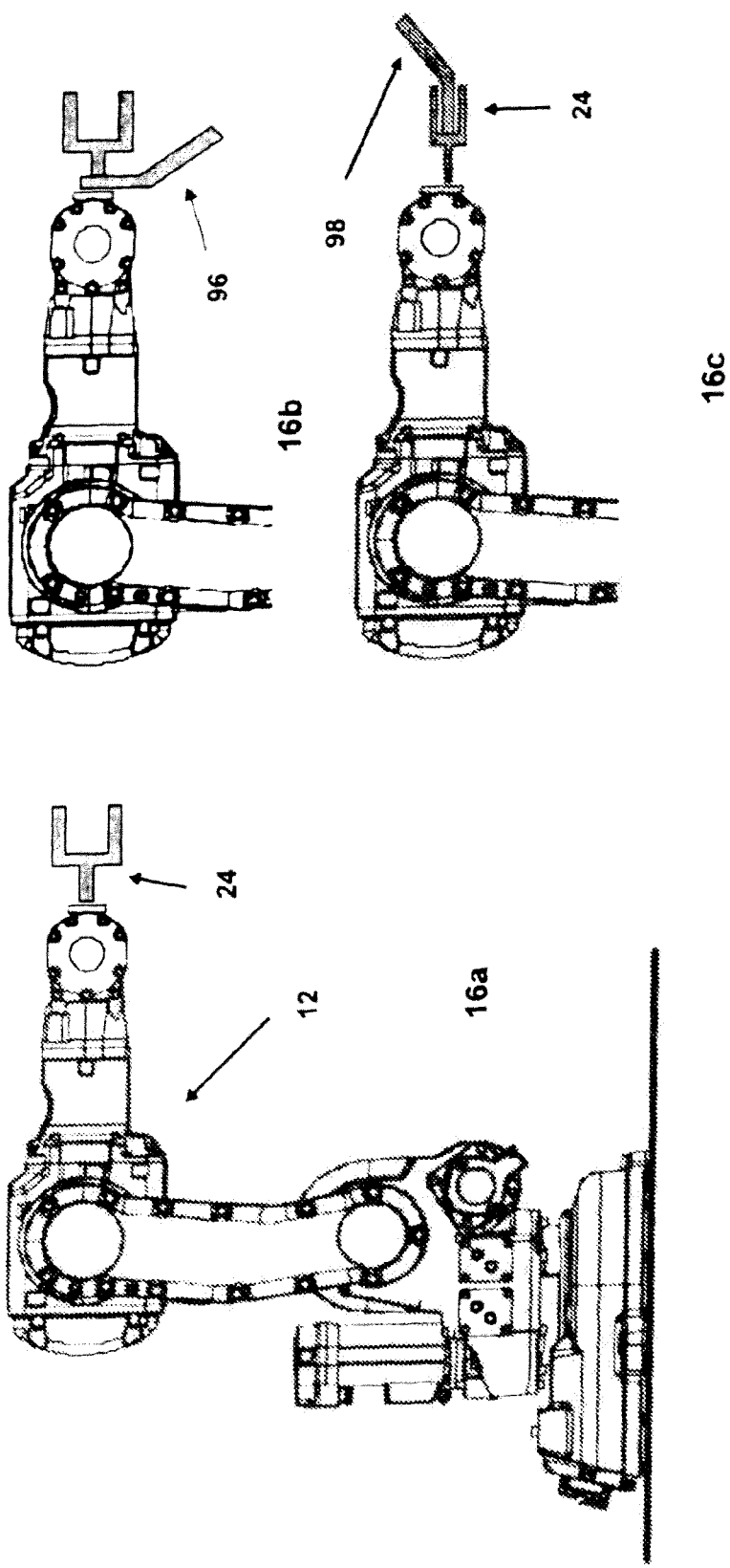
FIGS. 16a, 16b and 16c show embodiments of the present invention in which the robot stirs the parts by using either the part picking gripper, a stirring device that is attached to the robot, or a stirring device that is picked up dynamically by the gripper.

Referring now to FIGS. 16a, 16b and 16c, there are shown embodiments of the present invention in which the robot 12 stirs the parts by using either the part picking gripper 24, a stirring device that is attached to the robot 12, or a stirring device that is picked up dynamically by the gripper 24. More particularly, FIG. 16a shows the robot 12 with the gripper 24 for stirring the parts 41 in bin 40, FIG. 16b shows an additional stirring tool 96 mounted on the robot wrist 22 and FIG. 16c shows the embodiment wherein the gripper 24 holds a stirring device 98 that is picked up dynamically by the gripper 24 when it is determined by the controller 14 that the parts 41 in bin 40 have to be stirred.

Stirring can be used to change the orientation of the parts 41 so that parts can be picked. The need to change the parts orientation usually occurs when there are a large number of parts in the bin. It should be appreciated that stirring to change the orientation of the parts also changes the position of the parts. Stirring can also be used to gather all of the parts 41 in bin 40 near the center of the bin to make it easier for the robot 12 to reach the parts. The need to gather all of the parts near the center of the bin usually occurs when there are either few parts in the bin or some of the parts are at the sides or corners of the bin. Other uses for stirring include, without limitation, dispersing the parts so that individual parts are isolated from each other and/or gathering the parts into groups that are isolated from other. Stirring may also be initiated by the controller 14 or other computing device upon the occurrence of a predetermined event such as for example, and without limitation, the passage of time or a degradation of the cycle time.

Figure 17:
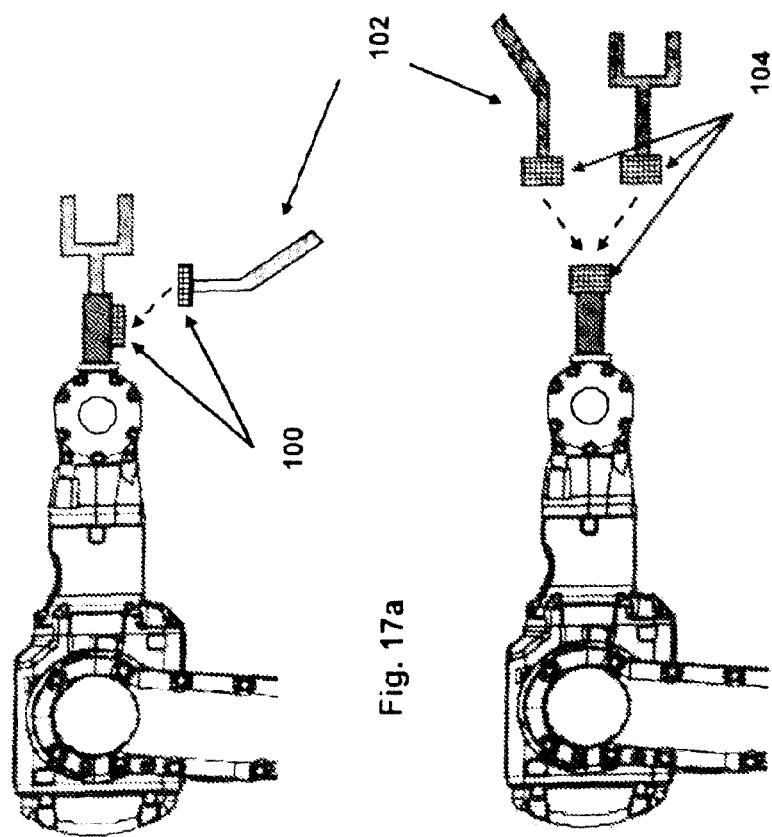
FIGS. 17a and 17b show embodiments in which the robot has an automated mounting mechanism that allows the robot to pick up the stirring device when needed and drop off that device when the stirring is completed.

FIGS. 17a and 17b show embodiments of the present invention in which the robot 12 has an automated mounting mechanism such as a standard tool changer 100 with tool mounting connectors 104 that allows the robot 12 to pick up the stirring device 102 when needed and drop off that device when the stirring is completed.

Figure 18:
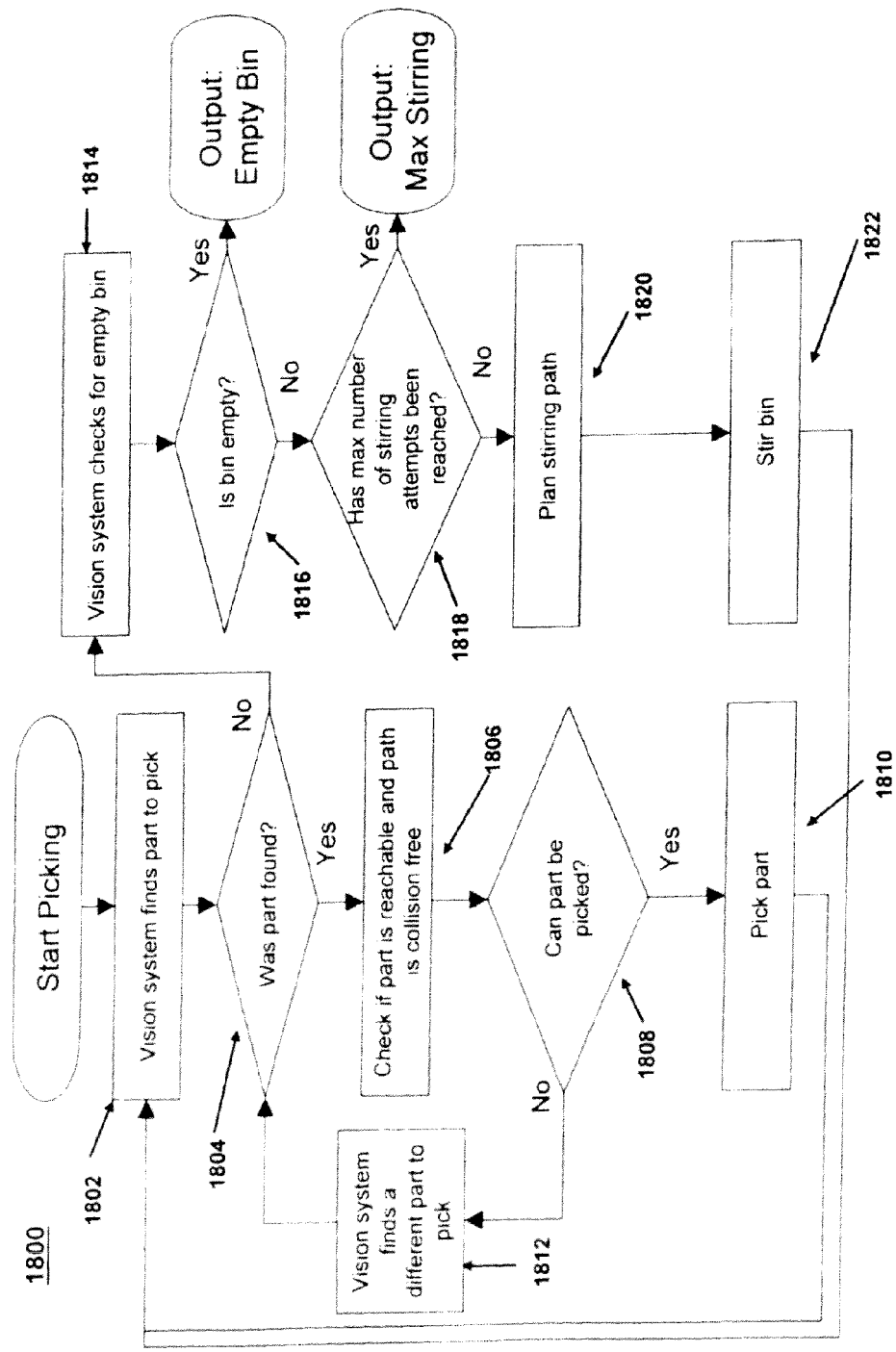
FIG. 18 is a flowchart for stirring the parts upon the occurrence of error conditions when the robot is attempting to pick parts from bin.

Referring now to FIG. 18, there is shown a flowchart 1800 for stirring the parts upon the occurrence of error conditions when the robot is attempting to pick parts 41 from bin 40. In block 1802 the vision system 36 finds a part 41 in bin 40 that can be picked by robot 12. The process then proceeds to decision 1804 where it is asked if the vision system found the part to pick. If the answer to that question is yes, the process proceeds to block 1806 where the bin picking system checks to determine if the part 41 that was found by vision system can be reached by the gripping mechanism 24 and the path that the robot 12 must follow to pick the part 41 is collision free. The process then proceeds to decision 1808 where the question is asked can the part 41 found by the vision system 36 be picked.

If the answer to the question in decision 1808 is yes, the process proceeds to block 1810 where the selected part 41 is picked from the bin 40. If the answer to the question in decision 1808 is no, the process proceeds to block 1812 where the vision system 36 finds another part 41 to pick and the process then returns to decision 1804.

Returning now to decision 1804, if the answer to the question asked therein is no, that is a part 41 to pick from bin 40 was not found, the process proceeds to block 1814 where the vision system 36 checks for an empty bin 40. After that check is completed, the process proceeds to decision 1816 where the question is asked is the bin empty. If the answer to that question is yes, the process outputs an empty bin signal to the controller 14 or other computing device so that operational personnel and the bin supply systems are informed that the bin 40 currently adjacent to the robot 12 does not have any parts 41 in it.

If the answer to the question in decision 1816 is no, that is, the bin 40 has parts 41 in it, the process proceeds to decision 1818 where the question is asked has the maximum number of stirring attempts been reached. If the answer to this question is yes, the process outputs a maximum stirring signal to the controller 14 or other computing so that operational personnel are informed that the stirring of the bin 40 has reached the maximum allowable number of stirs.

The number of stirring attempts can be counted on a "per bin basis", that is, a predetermined number of stirring attempts are allowed to occur for a bin before the system indicates that no more stirring is allowed to pick a part from the bin, or on a "per pick basis", that is a predetermined number of stirring attempts are allowed to occur for the picking of a part before the system indicates that no more stirring is allowed to pick that part from the bin. An optional counter can be used to limit the number of stirring attempts.

If the answer to the question in decision 1818 is no, that is, the maximum number of stirring attempts has not been reached, the process proceeds to block 1820 to plan a stirring path. The stirring path can be planned in the computing device that is controller 14 or in the computing device in vision system 36 or in both computing devices. The robot system may have other computing devices that are used alone or in any combination with controller 14 and/or the vision system computing device to plan the stirring path. It should be appreciated that while FIG. 18 has shown block 1820 following a no answer to decision 1818, the planning of the stirring path may occur before it is determined that that the maximum number of stirring attempts has not been reached.

The stirring path can be based on a fixed pattern. The fixed pattern could be preprogrammed in the controller 14. The fixed pattern path could simply move the tooling in a few circles or other predetermined paths, such as a figure eight or a star that would most likely move some of the parts 41. The predetermined path uses prior knowledge of the bin's shape and size to maximize its effectiveness. These fixed preprogrammed patterns could be automatically adjusted based on the bin size and shape or a user entered parameter. The user can be allowed to modify the patterns or create his or her own patterns.

Alternatively, the stirring path can be calculated by the controller 14 on the fly based on input from the vision system 36. The vision system 36 knows where some parts 41 are but they cannot be picked up by the robot 12. The vision based stirring path could move the robot tool 24 from visible part to visible part without retracting the tool. This will cause collisions, that is, stirring of the parts 41. There are other alternatives for movement of the tool 24 to obtain stirring, for example, the robot tool is moved to the visible part 41 but with a predetermined small offset. Both the preprogrammed stirring path and the path calculated based on input from the vision system 36 can also include an error check to avoid collisions with the bin walls.

The choice between the various stirring paths described above is based on the conditions in the bin. When there are a large number of parts in the bin, which can be determined roughly by looking at the height of the topmost parts, the primary picking problem is usually that the orientations of the parts need to be changed to allow the parts to be picked. In this situation, stirring with a predefined path accomplishes this goal.

When the number of parts are few, and/or some of the parts are at the sides and corners of a bin, a vision based stirring path is used to actively find those parts that are away from the bin's center and bring them together towards the center of the bin so that all of the parts in the bin are towards the bin center. This gathering of the parts makes it easier for the robot to reach the parts and therefore increases the likelihood that the parts are picked by the robot. In another embodiment, a predefined stirring path could also be used to move parts towards the center from one or more sides and/or corners of the bin.

Upon completion in block 1820 of the planning for a stirring path, the process proceeds to block 1822 where the bin 40 is stirred to make some of the parts 41 in the bin 40 reachable by grasping mechanism 24.

An optional way to assist in the stirring is to include a force sensing means with the robot 12 or tooling 24. This could be implemented by using a force sensor attached to the robot 12 or tooling 24, by monitoring the motor torques to detect force changes, monitoring deflection or pressure in a compliance device between the robot 12 and tooling 24, or any other contact sensing means. In any of these embodiments, the force feedback is used during the stirring to (1) make sure there is contact with at least some of the parts 41 in bin 40 to ensure some of them are being moved, and (2) to prevent damage to the robot 12, tool 24, bin 40 or parts 41. For example, damage to the parts 41 can occur when the parts 41 are in direct contact with the bin wall, and the robot 12 pushes the parts 41 into the wall. In another example, parts 41 could be obstructed, entangled, and/or interlocked in such as way that they cannot be moved without breaking them, the tooling 24, or the robot motors. Establishing a force limit prevents the robot 12 from pushing too hard in any direction where the parts 41 cannot be moved, no matter what the cause. Some compliance in the robot tooling 24 can be used in conjunction with the force sensing for added safety and flexibility.

Figure 19:
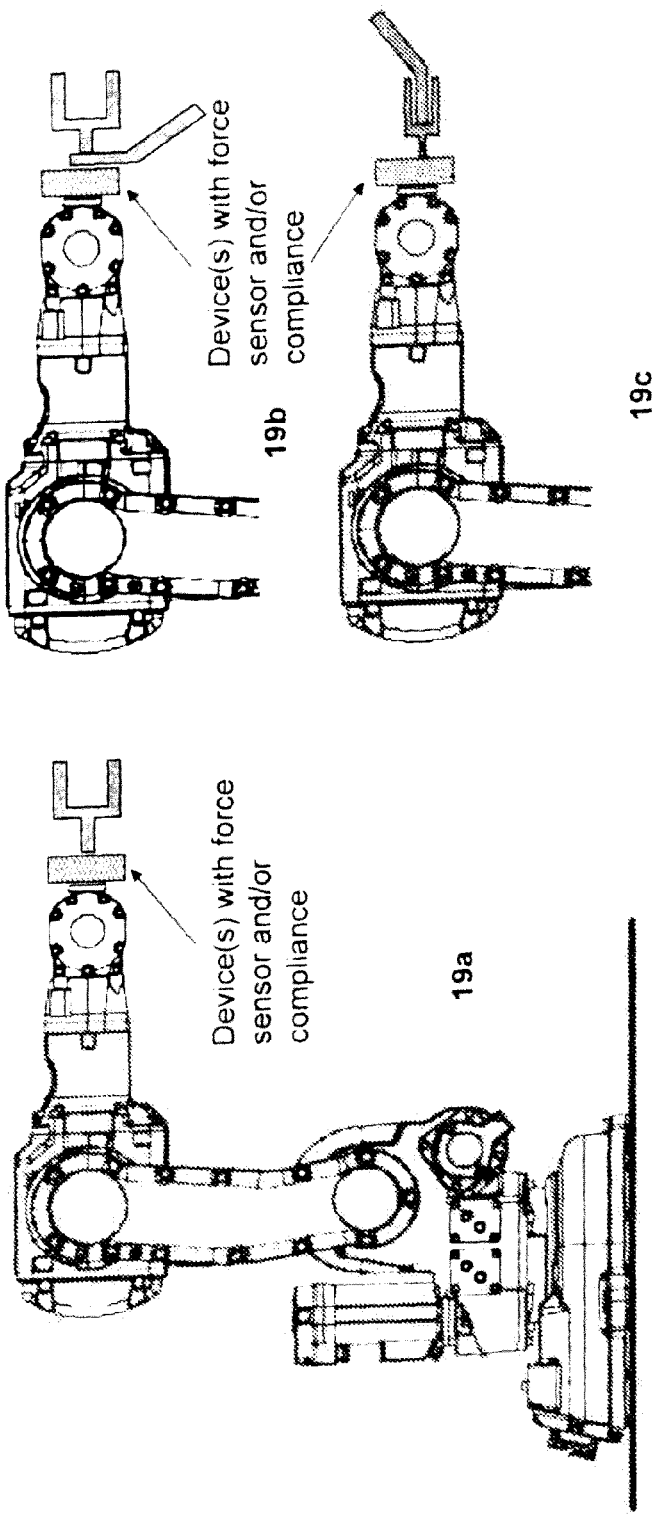
FIGS. 19a, 19b and 19c show for the robot shown in FIGS. 16a, 16b and 16c, respectively, an embodiment where the robot also has either force sensing or a compliance device between the robot and the tooling.

FIGS. 19a, 19b and 19c show for the robot 12 shown in FIGS. 16a, 16b and 16c, respectively, an embodiment where the robot 12 also has either force sensing from for example the force sensor 72 shown in FIGS. 14a, 14b and 14c or a compliance device such as that shown in FIGS. 2-4, 7-12 between the robot 12 and the tooling 24. FIGS. 20a and 20b show for the robot 12 shown in FIGS. 17a and 17b, respectively, an embodiment where the robot 12 also has either force sensing from for example the force sensor 72 shown in FIGS. 14a, 14b and 14c or a compliance device such as that shown in FIGS. 2-4, 7-12 between the robot 12 and the tooling 24.

If no force sensing is used to detect whether or not stirring has occurred, the vision system 36 can be used to verify that at least some parts have been moved by the stirring process. If stirring was attempted, but there has not been a significant change in the orientation of at least some of the parts, stirring can be retried with a different stirring path and/or pattern. A well known technique to determine if there has or has not been a significant change in the orientation of at least some of the parts is to compare two images to detect a change in the scene. A medium to large change in the scene means that parts have been moved.

This vision-based verification can also be used as a double check that stirring has occurred even if force sensing is used as well.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A compliant apparatus for use by a robot for picking of randomly distributed objects, said apparatus comprising:
one or more rigid components in a predetermined arrangement with more than one compliant device, each of said more than one compliant devices providing compliance in one or more degrees of freedom to facilitate extraction of one or more of said objects from said bin, wherein each one of said more than one compliant devices can have different amounts of compliance along different axes to provide more compliance in one or more degrees of freedom than in others.

2. The compliant apparatus of claim 1 further comprising one or more end points, each of said end points capable of picking up one of said objects.

3. A compliant apparatus for use by a robot for picking of randomly distributed objects, said apparatus comprising:
one or more end points, each of said end points capable of picking up one of said objects; and
one or more rigid components in a predetermined arrangement with more than one compliant device, each of said more than one compliant devices providing compliance in one or more degrees of freedom to facilitate extraction of one or more of said objects from said bin, wherein each one of said more than one compliant device can have different amounts of compliance along different axes to provide more compliance in one or more degrees of freedom than in others.

4. A compliant part picking apparatus for use by a robot having an end effector to pick one or more parts from a bin having one or more of said parts therein, said compliant part picking apparatus comprising:
a tool for picking one or more of said parts from said bin;
at least one rigid component connected to said picking tool; and
at least one compliant component having at least one degree of freedom connected to said at least one rigid component and said robot end effector, said compliant component having a controllable compliance to adjust both the position and orientation of said tool when said tool is picking one or more of said parts in said bin from said bin.

5. The compliant part picking apparatus of claim 4 wherein air pressure is used to control said controllable compliance of said compliant component.

6. The compliant part picking apparatus of claim 4 wherein pressure of a gas is used to control said controllable compliance of said compliant component and said compliant picking apparatus further comprises a gas pressure limit switch or a gas pressure sensor for monitoring and/or controlling the compliance of said compliant component to adjust only said position and orientation of said tool when said tool is picking one or more parts from said bin.

7. The compliant part picking apparatus of claim 4 further comprising two or more rigid components, said tool for picking said one or more parts from said bin connected to one of said two or more rigid components, said at least one compliant component connected directly to said rigid component connected to said tool or through another of said two or more rigid components to said rigid component connected to said tool.

8. The compliant part picking apparatus of claim 4 wherein said compliant component comprises either a gas filled device whose compliance depends on the pressure of said gas in said gas filled device or a compressible device whose compliance depends on its compressibility.

9. The compliant part picking apparatus of claim 8 wherein said gas filled device further comprises means for sensing said gas pressure in said gas filled device.

10. The compliant part picking apparatus of claim 8 wherein said compressible device further comprises means for detecting compliant motion of said compliant part picking device.

* * * * *